（12） United States Patent
Huang

(10) Patent No.: US 9,058,025 B2
(45) Date of Patent: Jun. 16, 2015

(54) STANDALONE BIOMETRIC AUTHORIZATION CONTROL DEVICE AND METHOD

(75) Inventor: Tao Huang, Coquitlam (CA)

(73) Assignee: Recludo AB, Sigtuna (SE)

( * ) Notice: Subject to any disclaimer, the term of this patent is extended or adjusted under 35 U.S.C. 154(b) by 277 days.

(21) Appl. No.: 13/883,738

(22) PCT Filed: Mar. 7, 2012

(86) PCT No.: PCT/SE2012/050252
§ 371 (c)(1),
(2), (4) Date: May 6, 2013

(87) PCT Pub. No.: WO2012/128698
PCT Pub. Date: Sep. 27, 2012

(65) Prior Publication Data
US 2013/0229259 A1      Sep. 5, 2013

Related U.S. Application Data

(60) Provisional application No. 61/465,749, filed on Mar. 24, 2011.

(51) Int. Cl.
*G05B 1/00*        (2006.01)
*G07C 9/00*        (2006.01)

(52) U.S. Cl.
CPC .............. *G05B 1/00* (2013.01); *G07C 9/00563* (2013.01); *G07C 9/00571* (2013.01); *G07C 9/00817* (2013.01); *G07C 9/00904* (2013.01); *G07C 2009/00849* (2013.01); *G07C 2209/08* (2013.01)

(58) Field of Classification Search
CPC ........... G07C 9/00563; G07C 9/00817; G07C 9/00904; G07C 9/00023; G07C 2209/08; G07C 9/00571; G07C 2009/00849; G05B 1/00
USPC .............. 340/5.28, 4.6, 5.52, 5.53, 5.82, 5.83
See application file for complete search history.

(56) References Cited

U.S. PATENT DOCUMENTS 6,794,986 B2     9/2004   Puchek et al.
6,972,660 B1    12/2005   Montgomery, Jr. et al.
7,116,211 B1 *  10/2006   Parker .......................... 340/5.33
(Continued)

FOREIGN PATENT DOCUMENTS

EP         1241633 A2     9/2002
EP         1748395 A1     1/2007
(Continued)

*Primary Examiner* — Edwin Holloway, III
(74) *Attorney, Agent, or Firm* — Capitol City TechLaw

(57) ABSTRACT

A standalone biometric authorization control device (10) comprises an input device (110) configured to receive a time sensitive authorization code comprising encrypted information about an authorization time schedule. Connected to the input device (110) is a control unit (120), configured to extract the authorization time schedule from the time sensitive authorization code, and to compare the extracted authorization time schedule with the current date and time. Connected to and controlled by the control unit (120) is a biometric sensor (130), which is configured to obtain biometric data from a user. The control unit (120) is further configured to register the biometric data obtained from the user into the current standalone biometric authorization control device (10) if the current date and time is within a time interval when registering of biometric data is allowed according to the extracted authorization time schedule.

17 Claims, 4 Drawing Sheets

(56) References Cited

U.S. PATENT DOCUMENTS

| | | | |
|---|---|---|---|
| 2002/0034321 A1 | 3/2002 | Saito et al. | |
| 2002/0149467 A1* | 10/2002 | Calvesio et al. | 340/5.52 |
| 2005/0154920 A1* | 7/2005 | Tartaglia et al. | 713/201 |
| 2006/0176146 A1 | 8/2006 | Krishan et al. | |
| 2007/0206838 A1* | 9/2007 | Fouquet | 382/115 |
| 2009/0299777 A1* | 12/2009 | Silberman | 705/5 |

FOREIGN PATENT DOCUMENTS

| | | |
|---|---|---|
| WO | 0232045 A1 | 4/2002 |
| WO | 0248485 A1 | 6/2002 |

* cited by examiner

STANDALONE BIOMETRIC AUTHORIZATION CONTROL DEVICE AND METHOD

TECHNICAL FIELD

The present invention generally relates to authorization control devices and methods and, more particularly, to standalone biometric authorization control devices and methods.

BACKGROUND

Hotel door lock security has traditionally involved mechanical access systems with keys or cards to grant the hotel guest access to a hotel room, and to protect the hotel guest from burglary. Administrations of these systems are both inconvenient and costly. The guest is forced to interact directly with the front desk to register and receive the access key/card to the door lock. Another factor of inconvenience is the need for the guest to physically carry around an object (the key/card) to be able to access the hotel door. This object could be lost or stolen.

Another problem for the hotel guest is the need for actually checking in and out. Even if the guest has already made the booking and paid for the whole stay in advance, he/she is obliged to announce his/her arrival. Arriving late at night bothers both the guest and the hotel staff that has to supply the guest with room key/card.

A solution to the inconvenience problem with carrying around an object could be to use biometric verification, such as fingerprint verification at the door lock. However the guest would still be forced to register the biometric information at a front desk upon arrival.

Today there is no existing solution that solves both the problem with time consuming and personnel intense check-in procedures and the inconvenience issue with carrying around an object for authorization.

SUMMARY

A general object of the present disclosure is to solve the above mentioned problems. This object is achieved through a time sensitive standalone biometric authorization control device and method according to the enclosed independent claims.

One aspect of the embodiments defines a standalone biometric authorization control device comprising an input device configured to receive a time sensitive authorization code comprising encrypted information about an authorization time schedule. The standalone biometric authorization control device further comprises a control unit, connected to the input device, where the control unit is configured to extract the authorization time schedule from the time sensitive authorization code, and to compare the extracted authorization time schedule with the current date and time. The standalone biometric authorization control device further comprises a biometric sensor, connected to and controlled by the control unit, where the biometric sensor is configured to obtain biometric data from a user. The control unit is further configured to register the biometric data obtained from the user into the current standalone biometric authorization control device if the current date and time is within a time interval when registering of biometric data is allowed according to the extracted authorization time schedule.

Another aspect of the embodiments defines a method for biometric authorization control. The method comprises receiving, in an input device, a time sensitive authorization code comprising encrypted information about an authorization time schedule. The method then comprises extracting, in a control unit, the authorization time schedule from the time sensitive authorization code, and comparing, in the control unit, the extracted authorization time schedule with the current date and time. The method further comprises obtaining, by a biometric sensor, biometric data from a user and registering, by the control unit, the biometric data obtained from the user into the current standalone biometric authorization control device, if the current date and time is within a time interval when registering of biometric data is allowed according to the extracted authorization time schedule.

One advantage of the present invention is that registration of biometric verification data is enabled without involvement of system personnel or central check-in devices. Further advantages are described in connection with the description of the different embodiments.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

The present disclosure concerns biometric authorization control devices and methods in general. A particular field of use is access control for the hotel business, but the different embodiments described herein can also be implemented in other applications for granting different types of authorization to different types of systems.

Throughout the drawings, the same reference numbers are used for similar or corresponding elements.

Figure 1:
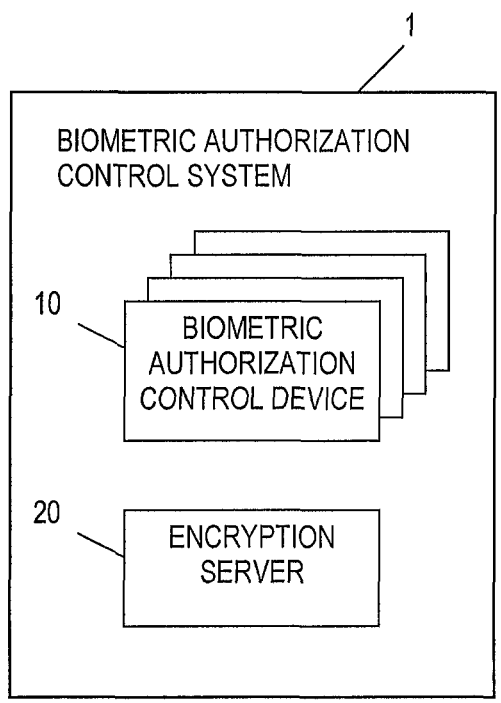
FIG. 1 is a block diagram of an embodiment of a standalone biometric authorization control system.

The embodiments described here below are in particular intended to be used for time sensitive fingerprint remote access control for the hotel business. The method and device described herein make it possible to control access on distance and only grants access within time frames paid for by the hotel guest, according to an authorization time schedule, FIG. 1 illustrates an embodiment of a biometric authorization control system 1. The biometric authorization control system comprises one or more standalone biometric authorization control devices 10 as will be described more in detail below, and an encryption server 20. The encryption server 20 is in this embodiment configured to encrypt an authorization time schedule into a time sensitive authorization code using an encryption key which is unique for each standalone biometric authorization control device 10.

Figure 2:
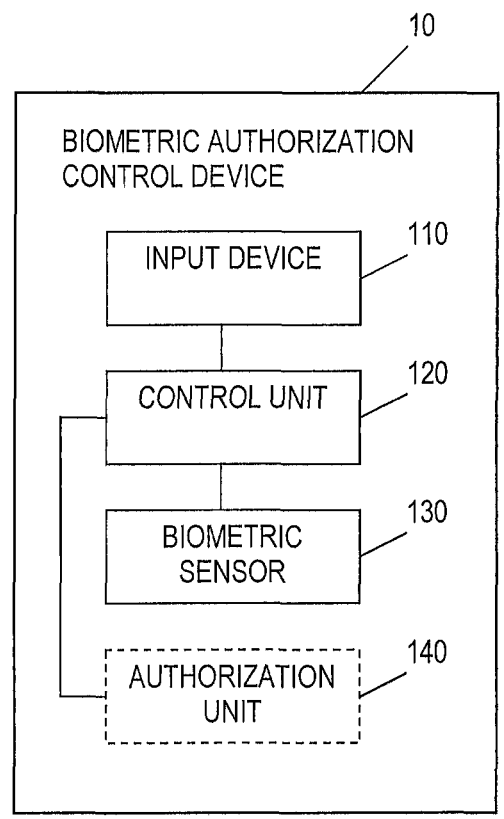
FIG. 2 is a block diagram of an embodiment of a standalone biometric authorization control device.

FIG. 2 illustrates an embodiment of a general standalone biometric authorization control device 10. The standalone biometric authorization control device 10 comprises an input device 110 configured to receive a time sensitive authorization code comprising encrypted information about an authorization time schedule. Connected to the input device 110 is a control unit 120 configured to extract the authorization time schedule from the time sensitive authorization code obtained from the input device 110. The control unit 120 is further configured to compare the extracted authorization time schedule with the current date and time. Connected to and controlled by the control unit 120 is also a biometric sensor 130, which is configured to obtain biometric data from a user. The control unit 120 is further configured to register the biometric data obtained from the user into the current standalone biometric authorization control device 10 if the current date and time is within a time interval when registering of biometric data is allowed according to the extracted authorization time schedule. A representation of the extracted authorization time schedule is also registered with an association to the registered biometric data of the user. In a particular embodiment, the control unit 120 registers the biometric data obtained from the user if the biometric data obtained from the user is not already registered. However, in another embodiment the control unit 120 registers the biometric data obtained from the user even if the biometric data obtained from the user is already registered, for example if the already registered data is not good enough (due to e.g. bad quality of the data) to be used for providing authorization for the user. How to provide authorization for the user will be described below.

According to a particular embodiment, the control unit 120 is further configured to extract the authorization time schedule from the time sensitive authorization code using a decryption key which is unique for a specific standalone biometric authorization control device 10.

The control unit 120 in the standalone biometric authorization control device 10 uses the same encryption/decryption key as in the encryption server 20, runs the decryption algorithm to decrypt the authorization code to get the authorization time schedule preset by the owner, and checks the authorization time schedule with the current date and time which is kept in the real-time clock. In a particular embodiment, if the current date and time is within the authorization time schedule, the control unit 120 sends an audible and/or visible signal of acceptance to the user. If the current date and time is outside of the authorization time schedule, the control unit 120 sends an audible and/or visible signal of rejection to the user.

If the user receives a signal of acceptance from the control unit 120, the user provides his/her biometric data to the biometric sensor 130. The control unit 120 reads the biometric data from the user and processes the biometric data by a biometric data processing algorithm. In a particular embodiment, the control unit 120 stores the processed biometric data in a flash memory and labels the stored biometric data with the authorization time schedule, which is decrypted from the entered authorization code.

If needed, the user can use the input device 110 to add other users' biometric data to allow other users to get authorization to the standalone biometric authorization control device 10 using biometric data.

In a particular embodiment, shown with dotted lines in FIG. 2, is an authorization unit 140 connected to and controlled by the control unit 120. In this embodiment the authorization unit 140 is configured to provide authorization for a user as a response to a control signal from the control unit 120, and the control unit 120 is then configured to supply the authorization unit 140 with such a control signal if the biometric data obtained from the user corresponds to the biometric data registered in the current standalone biometric authorization control device 10, and if the current date and time is within a time interval when providing authorization is allowed according to the associated extracted authorization time schedule.

The authorization unit 140 may, according to a preferred embodiment, be some kind of access control device, and in a particularly preferred embodiment a door lock device, for example a door lock to a hotel room.

When the user needs to get authorization to the standalone biometric authorization control device 10, he/she just needs to provide his/her biometric data to the biometric sensor 130. The control unit 120 reads the biometric data from the user, processes the biometric data by a biometric data processing algorithm, and then compares the obtained biometric data with all stored biometric data one by one.

If the obtained biometric data matches any of the stored biometric data, the control unit 120 further checks the labeled authorization time schedule for this matched biometric data with current date and time, which in this embodiment is kept in the real-time clock.

If the labeled authorization time schedule is valid and the current date and time is within the valid authorization time schedule, the control unit 120 in a particular embodiment sends an audible and/or visible signal of acceptance to the user and provides authorization to the standalone biometric authorization control device 10. In a particular embodiment, the control unit 120 records this successful authorization event in its flash memory for audit trail.

If the labeled authorization time schedule is valid but the current time is outside of the valid authorization time schedule, the control unit 120 in a particular embodiment sends audible and/or visible signal of rejection to the user and denies authorization to the standalone biometric authorization control device 10. This situation may occur e.g. for users who are granted authorization only at certain times of the day, but for more than one day. If such a user then tries to access a property at the "wrong" time of day, the authorization time schedule may be valid, but the time is outside of the valid authorization time schedule. Then the control unit will not provide authorization for that time. Examples of users who may be supplied with an authorization time schedule of this kind are maintenance personnel, cleaning personnel etc.

If the labeled authorization time schedule is invalid/expired, the control unit 120 in a particular embodiment sends audible and/or visible signal of rejection to the user and denies authorization to the standalone biometric authorization control device 10. In a particular embodiment, the control unit 120 removes the corresponding stored biometric data and its labeled authorization time schedule from the flash memory.

If the obtained biometric data doesn't match any of the stored biometric data, the control unit 120 in a particular embodiment sends an audible and/or visible signal of rejection to the user and denies authorization to the standalone biometric authorization control device 10.

Figure 3:
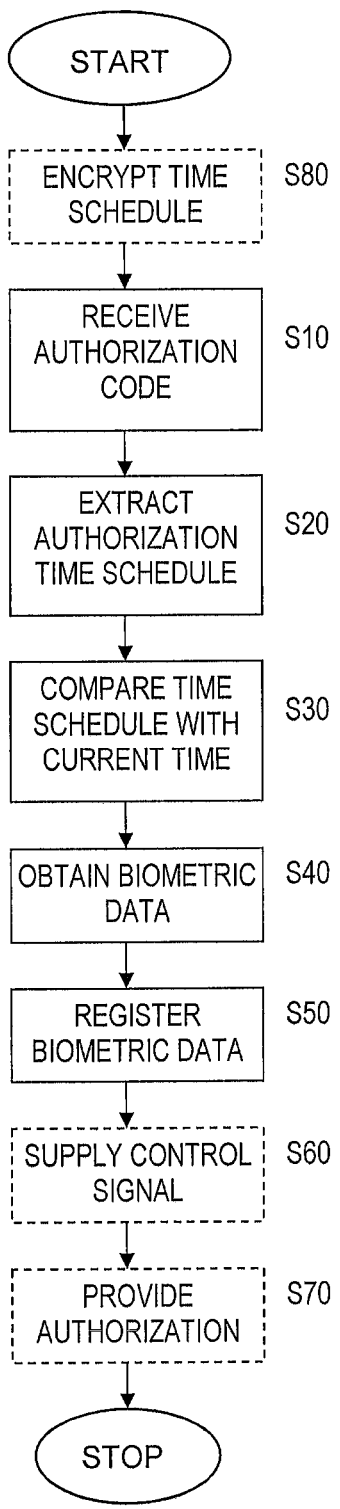
FIG. 3 illustrates steps of an embodiment of a method for biometric authorization control.

FIG. 3 illustrates an embodiment of a method for biometric authorization control. The method starts in step S10, where an input device receives a time sensitive authorization code comprising encrypted information about an authorization time schedule. The method then continues in a next step S20 where a control unit extracts the authorization time schedule from the time sensitive authorization code by decrypting it using a predetermined decryption scheme. In a next step S30 the control unit compares the extracted authorization time schedule with the current date and time. In a next step S40, a biometric sensor obtains biometric data from a user, and finally, in a step S50, the control unit registers the biometric data obtained from the user into the current standalone biometric authorization control device if the current date and time is within a time interval when registering of biometric data is allowed according to the extracted authorization time schedule. A representation of the extracted authorization time schedule is also registered with an association to the registered biometric data of the user. In a particular embodiment, the control unit registers the biometric data obtained from the user if the biometric data obtained from the user is not already registered. However, in another embodiment the control unit registers the biometric data obtained from the user even if the biometric data obtained from the user is already registered, for example if the registered data is not good enough (due to e.g. bad quality of the data) to be used for providing authorization for the user.

In a particular embodiment, the step S20 of FIG. 3 comprises extracting the authorization time schedule from the time sensitive authorization code using a decryption key which is unique for a specific standalone biometric authorization control device.

Also shown in FIG. 3 is a particular embodiment illustrated by broken boxes S60 and S70. This particular embodiment comprises an additional step S60, where the control unit supplies an authorization unit with a control signal if the biometric data obtained from the user corresponds to the biometric data registered in the current standalone biometric authorization control device, and if the current date and time is within a time interval when providing authorization is allowed according to the extracted authorization time schedule. In an additional step S70 the authorization unit provides authorization for a user as a response to the control signal from the control unit.

Also shown in FIG. 3 is a particular embodiment illustrated by a broken box S80. This particular embodiment comprises an additional step S80, where an encryption server encrypts an authorization time schedule into a time sensitive authorization code using an encryption key which is unique for a specific standalone biometric authorization control device.

In one embodiment, the system is a hotel door lock system that consists of an authorization code generating server and a plurality of standalone lock devices with a respective input device, such as a keypad, and a respective biometric sensor, such as a fingerprint sensor.

The server encrypts the check-in and check-out date and time to generate the time sensitive authorization code that allows the guest to input his/her fingerprint into the lock device. The authorization code doesn't primarily open the door physically, but it allows inputting of the guest's fingerprint into a memory of the lock device.

The lock device decrypts the authorization code to get the check-in and check-out date and time, compares the check-in and check-out date and time with present date and time, which in the present embodiment is kept by a real-time clock in the lock device, and determines if the present date and time is in between the check-in and check-out date and time. If the present date and time is in between the check-in and check-out date and time, the guest can input the fingerprint for registration into the lock device.

After completing the fingerprint input, the guest can use the fingerprint to unlock the door during the whole hotel stay. When the time passes the check-out date and time, the fingerprint will not be valid anymore to unlock the door, and the registered fingerprint is preferably erased from the memory. This assures the personal integrity of the guest after the end of the hotel visit, The main benefit of this invention is the convenience. The guest can reserve and pay for a hotel room online and receive the time sensitive authorization code by e.g. email or SMS. When arriving at the hotel, the guest can go straight to the room and input the fingerprint for registration and subsequent unlocking of the room door. During the whole stay, the guest and company staying in the same room do not have to carry around any key or card to access the room.

Also the hotel will experience major advantages. The hotel does not have to invest in expensive network infrastructure that normally is the case for biometric access system, since the standalone lock device of this invention does not need to be connected to a network. The staff requirement and need for front desk services is also decreased. In fact, the product is suitable for e.g. self service hotels with no front desk at all. The time sensitive authorization code generating server controls the access to the room even at a distance and the administration is made very simple.

Figure 4:
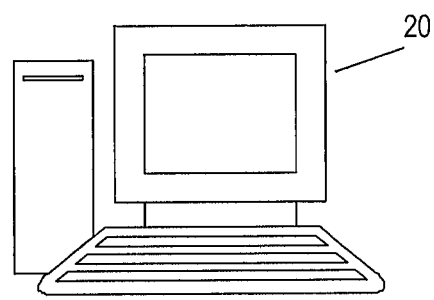
FIG. 4 illustrates an embodiment of an encryption server.

FIG. 4 illustrates an embodiment of an encryption server 20. The encryption server 20 may be implemented on e.g. a PC or a website server in a particular embodiment. The encryption server 20 is used for maintaining registered information about each standalone lock device, for encrypting the authorization time schedule preset by the owner to generate the authorization code, for sending the authorization code to the user, and for maintaining authorization code records generated by the owner. Note that the authorization code itself is not used to unlock the lock device. It's only used to authorize the user to be able to record and use his/her fingerprint, or other biometric data, to access the property according to the time schedule preset by the owner.

Figure 5A:
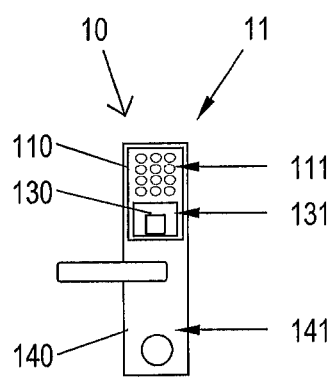
FIG. 5A illustrates an embodiment of a standalone biometric door lock.

FIG. 5A illustrates an embodiment of a standalone fingerprint lock device 11 as an authorization control device 10, in this embodiment with a keypad 111 as input device 110, and a fingerprint reader 131 as biometric sensor 130. The standalone fingerprint lock device 11 is in this embodiment configured to accept the authorization code entered by the user, decrypt the entered authorization code to get the authorization time schedule preset by the owner, read the user's fingerprint, and check the restricted time schedule with the current date and time. In a particular embodiment the current date and time is kept in a real-time clock, to control the access to the property. The standalone fingerprint lock device 11 comprises in this embodiment a door lock 141 as authorization unit 140.

Figure 5B:
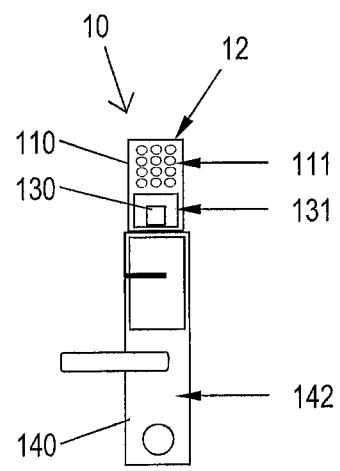
FIG. 5B illustrates another embodiment of a standalone biometric door lock.

FIG. 5B illustrates another embodiment of a standalone biometric authorization control device 10. The standalone biometric authorization control device 10 is here an add-on device 12, connected to a standard key card lock 142 as authorization unit 140. The add-on device 12 comprises a fingerprint reader 131 and a keypad 111. It has a similar function as the device of FIG. 5A, but it can be used on already existing key card locks 142, with the keypad 111 and fingerprint reader 131 provided by the add-on device 12. This approach can work with both key card and fingerprint to control access to the property.

The input device of the standalone biometric authorization control device may be selected as at least one of several different input devices. For example, a keypad can be used to manually enter an authorization code in the form of a sequence of characters. It is a well-known, reliable and inexpensive technique that can easily be implemented. A card reader may also be used to read an authorization code registered on e.g. a magnetic strip. It may be easier for the user to just draw the card instead of entering a long sequence of characters with a risk of entering them wrongly. An alternative input device could also be a barcode reader for reading an authorization code distributed as a barcode. It has similar advantages as the card reader but the bar code is even easier to distribute, for instance it may also be sent as e.g. an email or MMS to the user. It would also be possible to use a microphone as an input device, in order to input an authorization code in the form of a sound of some kind. The sound may then be distributed e.g. to the user's mobile phone as an audio file. If the input device is instead a speech recognition device, the authorization code may be a code word, which the user enters by speaking into the speech recognition device. The input device may also be an RF wireless receiver for receiving an authorization code as an RF transmission from e.g. the user's mobile phone, or an IR receiver if the authorization code is transferred via IR. Both RF and IR are well-known techniques included in most mobile phones, carried by most people nowadays. Other input devices may also be used in the present invention. A standalone biometric authorization control device may also comprise several input devices, in order to allow for more than one type of authorization code entering.

The biometric sensor of the standalone biometric authorization control device may be selected as at least one of several different biometric devices. Today the most commonly used biometric sensor device is probably the fingerprint reader. They are already used in the hotel business and also in other applications, and therefore the availability of the sensors is good and the acceptance for this technique is high. Another biometric sensor device that may be used is the iris reader. This is also a technique that is getting more widely used and may have even better security than the fingerprint reader. A fingerprint may more easily be damaged e.g. if the user cuts or burns the finger. A new technique similar to these is blood vessel recognition. The small blood vessels in the hand form a significant pattern which is unique for a person, and hence they may also be used to identify a user. An alternative biometric identification technique that may be used in the present invention is face recognition. This technique requires less expensive sensors and may also seem less invasive to the user than e.g. scanning of the eye or fingers and may thus be more readily accepted by the user. Similar advantages may also apply for voice recognition, which also may be used as a biometric identification technique in the present invention. Other biometric sensors may also be used in the present invention as well. A standalone biometric authorization control device may also comprise several biometric sensors, or combinations of biometric sensors and other identification devices, in order to allow for more than one type of identification.

In order to keep track of the current date and time, one embodiment of the standalone biometric authorization control device contains a real-time clock configured to keep the current date and time for comparing with the extracted authorization time schedule. In another embodiment, the present date and time can be obtained by the standalone biometric authorization control device by receiving time information e.g. by radio signaling.

It may be of importance to record the authorization events in order to be able to check that the authorization is working as expected. Therefore, in an embodiment, the control unit is also configured to register authorization events.

According to one embodiment, the standalone biometric authorization control device contains a flash memory configured to store the decryption key which is unique for each standalone biometric authorization control device. According to another embodiment, the standalone biometric authorization control device also contains a flash memory configured to store the extracted authorization time schedule and the registered biometric data. According to yet another embodiment, the standalone biometric authorization control device also contains a flash memory configured to store the authorization events registered by the control unit. The same or different flash memories may be used for all of these purposes.

Figure 6:
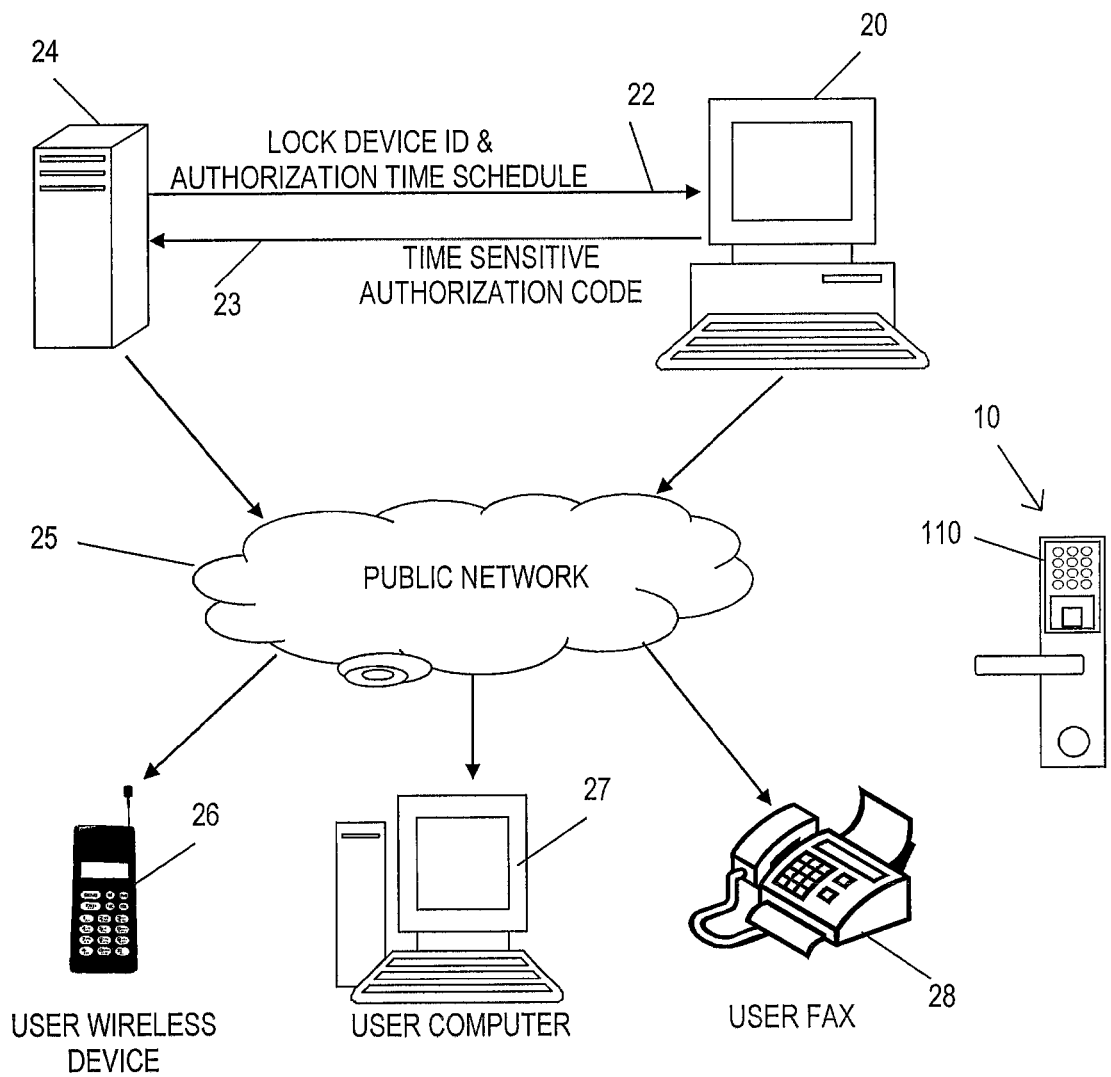
FIG. 6 is a schematic illustration of the information flow during the process of granting authorization to a property according to an embodiment.

The information flow during the process of granting authorization to a property can be described in connection to FIG. 6. On setup, the encryption server 20 and the standalone biometric authorization control device 10 are using the same unique encryption/decryption key. This encryption/decryption key is a private key to be used by the encryption server 20 to encrypt the authorization time schedule preset by the owner to generate the authorization code, and used by the standalone biometric authorization control device 10 to decrypt the authorization code entered by the user to get the authorization time schedule. The local current date and time are also set in the standalone biometric authorization control device 10, so the real-time clock in the standalone biometric authorization control device 10 can keep the current local date and time running. Note that the standalone biometric authorization control device 10 is not connected to the encryption server 20.

When needed to grant authorization to a property, the owner logs into the encryption server 20, selects the standalone biometric authorization control device 10 for that property and puts in the authorization time schedule he/she wants. This is suitably handled e.g. by use of a property management system 24. The input info 22 is then submitted to the encryption server 20. The encryption server 20 finds out the unique encryption/decryption key for this standalone biometric authorization control device 10 from its database, uses the encryption/decryption key to run the encryption algorithm to encrypt the authorization time schedule to generate the authorization code. Then, the owner can send the authorization code to the user who should be granted authorization to the property according to the authorization time schedule. In the present embodiment the user can receive the authorization code by e.g. mobile phone 26, email 27, or fax 28, as is also illustrated in FIG. 6, typically via public network 25.

With the authorization code, the user goes to the property and inputs the authorization code into the standalone biometric authorization control device 10 by using the input device 110 of the standalone biometric authorization control device 10.

The biometric authorization control system and method described herein can be used in, but is not limited to, the following applications:

Hotel/motel guest room access control.
Vacation rental house access control.
University dormitory room access control.
Office door access control.
Hospital room door access control.
Airport restricted door access control.
Any restricted area access control.

The invention claimed is:

1. A standalone biometric authorization control device comprising:
    an input device configured to receive a time sensitive authorization code including encrypted information about an authorization time schedule;
    a control unit connected to the input device,
    the control unit configured to extract the authorization time schedule from the time sensitive authorization code, and
    the control unit configured to compare the extracted authorization time schedule with the current date and time; and
    a biometric sensor connected to and controlled by the control unit,
    the biometric sensor configured to obtain biometric data from a user, and the control unit configured to register the biometric data obtained from the user into the standalone biometric authorization control device if the current date and time is within a time interval when registering of biometric data is allowed according to the extracted authorization time schedule.

2. The standalone biometric authorization control device according to claim 1, wherein the control unit is configured to extract the authorization time schedule from the time sensitive authorization code using a decryption key which is unique to the standalone biometric authorization control device.

3. The standalone biometric authorization control device according to claim 1, further comprising:
    an authorization unit, connected to and controlled by the control unit,
    the authorization unit configured to provide authorization for a user as a response to a control signal from the control unit, and
    the control unit configured to supply the authorization unit with the control signal if the biometric data obtained from the user corresponds to the biometric data registered in the standalone biometric authorization control device, and if the current date and time is within a time interval when providing authorization is allowed according to the extracted authorization time schedule.

4. The standalone biometric authorization control device according to claim 3, wherein the authorization unit includes an access control device.

5. The standalone biometric authorization control device according to claim 4, wherein the access control device includes a door lock device.

6. The standalone biometric authorization control device according to claim 1, wherein the input device is at least one of the following devices:
    a keypad;
    a card reader;
    a barcode reader;
    a microphone;
    a speech recognition device;
    an RF wireless receiver; and
    an IR receiver.

7. The standalone biometric authorization control device according to claim 1, wherein the biometric sensor is at least one of the following devices:
    a biometric fingerprint reader;
    a biometric iris reader;
    a face recognition device;
    a voice recognition device; and
    a blood vessel recognition device.

8. The standalone biometric authorization control device according to claim 1, further comprising a real-time clock configured to keep the current date and time for comparing with the extracted authorization time schedule.

9. The standalone biometric authorization control device according to claim 2, further comprising a flash memory configured to store the decryption key.

10. The standalone biometric authorization control device according to claim 1, further comprising a flash memory configured to store the extracted authorization time schedule and the biometric data registered in the standalone biometric authorization control device.

11. The standalone biometric authorization control device according to claim 3, wherein the control unit is configured to register authorization events.

12. The standalone biometric authorization control device according to claim 11, further comprising a flash memory configured to store the authorization events registered by the control unit.

13. A biometric authorization control system comprising:
    at least one standalone biometric authorization control device according to claim 1; and
    an encryption server configured to encrypt an authorization time schedule into a time sensitive authorization code using an encryption key which is unique to a specific standalone biometric authorization control device.

14. A method for biometric authorization control comprising:
    receiving, in an input device, a time sensitive authorization code including encrypted information about an authorization time schedule;
    extracting, in a control unit, the authorization time schedule from the time sensitive authorization code;
    comparing, in the control unit, the extracted authorization time schedule with the current date and time;
    obtaining, by a biometric sensor, biometric data from a user; and
    registering, by the control unit, the biometric data obtained from the user into a standalone biometric authorization control device if the current date and time is within a time interval when registering of biometric data is allowed according to the extracted authorization time schedule.

15. The method for biometric authorization control according to claim 14, wherein the extracting includes extracting the authorization time schedule from the time sensitive authorization code using a decryption key which is unique to the standalone biometric authorization control device.

16. The method for biometric authorization control according to claim 14, further comprising:
    supplying, by the control unit, an authorization unit with a control signal if the biometric data obtained from the user corresponds to the biometric data registered in the standalone biometric authorization control device, and if the current date and time is within a time interval when providing authorization is allowed according to the extracted authorization time schedule; and
    providing, in the authorization unit, authorization for a user as a response to the control signal from the control unit.

17. The method for biometric authorization control according to claim 14, further comprising:
    encrypting, in an encryption server, an authorization time schedule into a time sensitive authorization code using an encryption key which is unique to the standalone biometric authorization control device.

* * * * *